July 14, 1936.   C. K. DEWEY   2,047,580
NOZZLE ATTACHMENT
Filed Sept. 17, 1935
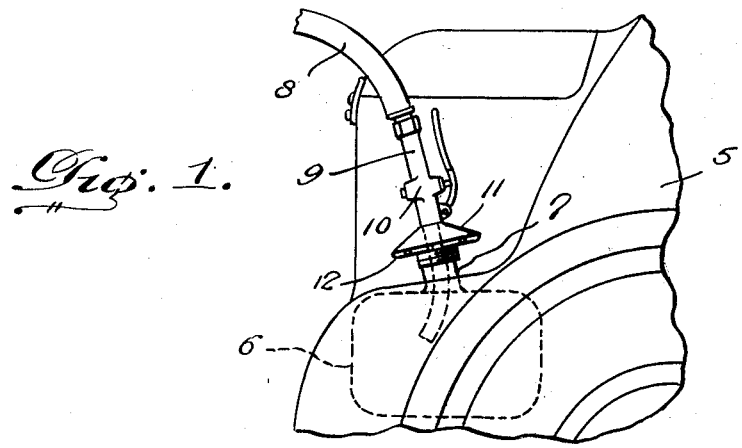
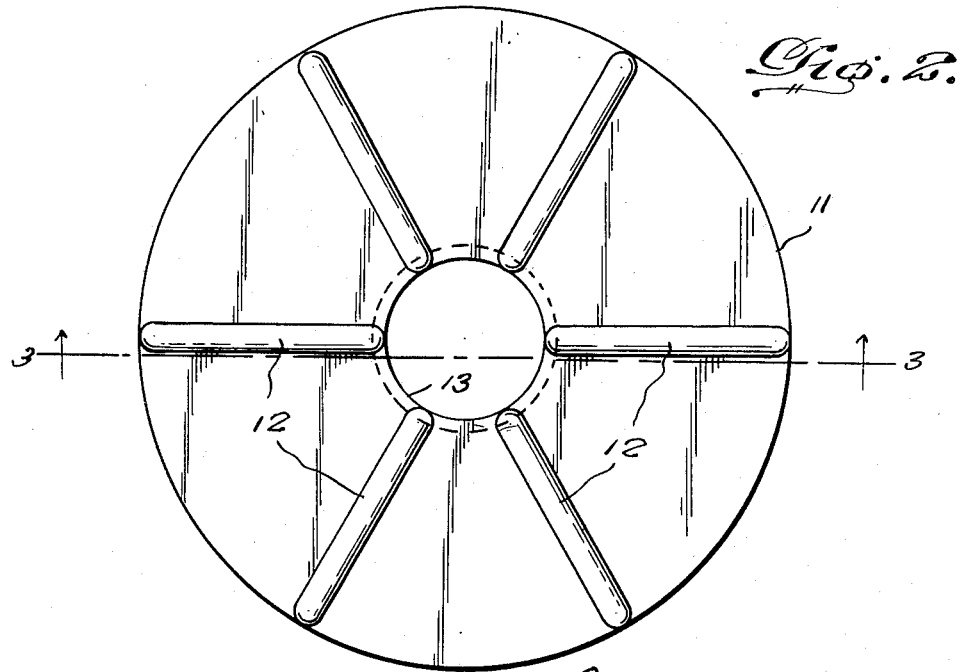
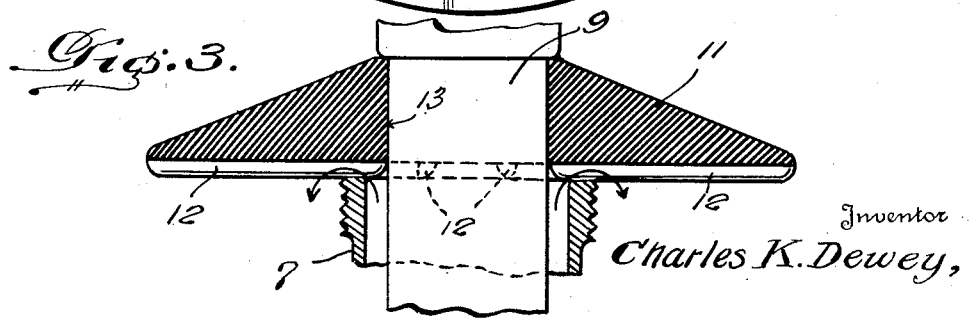
Inventor
Charles K. Dewey,
By J. Stanley Burch
Attorney Patented July 14, 1936

2,047,580

UNITED STATES PATENT OFFICE 2,047,580

NOZZLE ATTACHMENT

Charles K. Dewey, Auburn, N. Y.

Application September 17, 1935, Serial No. 40,964

3 Claims. (Cl. 221—84)

This invention relates to gasoline dispensing pumps of that type commonly employed at filling stations for supplying gasoline to the fuel tanks of motor vehicles, and has more particular reference to an attachment for the discharge nozzle of the outlet hose of such a pump, whereby rain, snow, and other foreign matter are prevented from entering the fuel tank of an automobile through the filling neck thereof when the closure of said filling neck is removed and said nozzle is inserted in said filling neck during the gasoline dispensing operation.

The gasoline trade has suffered from considerable criticism from motorists because of the fact that rain water, snow and other foreign matter have been allowed to enter the fuel tanks of motor vehicles while supplying gasoline to such tanks, particularly because such foreign matter has a detrimental effect upon the performance of the driving motor of such vehicles. It is accordingly the primary object of the present invention to provide a simple member which may be readily applied to the discharge nozzle on the outlet hose of a gasoline dispensing pump, so as to act as a shield or closure for the portion of the filling neck of a motor vehicle fuel tank which surrounds said discharge nozzle while the latter is inserted in said filling neck during the gasoline dispensing operation, and so as to thereby effectively prevent entrance of rain, snow and other foreign matter into such tank through said filling neck thereof during such time.

A further object of the present invention is to provide an attachment of the above kind which may be readily and economically manufactured, and which will have a long period of usefulness.

Still another object of the present invention is to provide means whereby the closure will permit the escape of air from the fuel tank as it is displaced by the gasoline supplied to such tank, while effectively preventing entrance of rain, snow and other foreign matter into the fuel tank through its filling neck.

The present invention consists in the novel combination and construction hereinafter more fully described, shown in the accompanying drawing, and claimed.

In the drawing:

Figure 1 is a fragmentary side elevational view illustrating the discharge nozzle on the outlet hose of a gasoline dispensing pump, inserted in the filling neck of the fuel tank of a motor vehicle and equipped with a shield or closure attachment embodying the present invention.

Figure 2 is an enlarged bottom plan view of the attachment shown in Figure 1; and Figure 3 is a fragmentary section of the construction shown in Figure 1, the plane of section being on line 3—3 of Figure 2.

Referring more in detail to the drawing, 5 indicates the rear portion of an automobile having a fuel tank 6 provided with the usual filling neck 7 which may be externally threaded for reception of a removable closure cap, as shown and well known in the art. Gasoline is usually supplied to the fuel tank 6 at a filling station, by means of a gasoline dispensing pump having an outlet hose 8 provided with a discharge nozzle 9, which nozzle has a manually operable shut-off valve 10 and is adapted to be inserted in the filling neck 7 during the operation of supplying gasoline to the tank 6. The filling necks of motor vehicle fuel tanks obviously vary in size, and are invariably considerably larger in diameter than the nozzle 9, a fact which incidentally allows for the displacement of air from the fuel tank through the filling neck 7 about the nozzle 9 as the fuel is supplied to, or rises in the tank 6. More important, however, is the fact that the space between the filling neck 7 and the nozzle 9 affords opportunity for rain, snow and other foreign matter to enter the fuel tank 6 through the filling neck 7 while the closure cap of the latter is removed and the nozzle 9 is inserted in said filling neck during the gasoline dispensing operation. The present invention accordingly aims to provide a shield or closure applied to the nozzle 9 and adapted to cover the portion of the filling neck 7 surrounding the nozzle 9 during the gasoline dispensing operation, so as to prevent the entrance of such foreign matter into the fuel tank, and to thereby consequently prevent such foreign matter from interfering with the efficiency of operation of the motor vehicle motor.

In accordance with the present invention, the nozzle 9 is provided with a cover plate 11 at a point outwardly of the shut-off valve 10 and adapted to rest upon the upper end of the filling neck 7, such cover plate being of a diameter considerably greater than that of the various filling necks of automobile fuel tanks so as to project some distance outwardly beyond the sides of such filling neck and thereby effectively exclude the entrance of rain, snow and other foreign matter from said fuel tanks through the filling necks thereof during the gasoline dispensing operation. In use, the nozzle 9 may be supported so that the cover plate overlies but is slightly spaced from the filling neck 7, to thereby permit air to be displaced from the fuel tank through the filling neck 7 as the level of fuel rises in the tank 6 during the gasoline dispensing operation. However, such slight spacing of the cover plate 11 from the upper end of the filling neck 7 may be positively effected by providing the under side of the latter with suitable lugs or ribs 12 arranged to engage the upper end of the filling neck 7 and maintain the lower face of the plate 11 in such slightly spaced relation to said upper end of the filling neck 7 as shown in Figure 3. A suitable arrangement of ribs for this purpose is illustrated, wherein the ribs 12 extend radially of the under surface of plate 11 from the central opening 13 of the latter to the outer periphery of the same. The opening 13 is of a size corresponding to the external diameter of nozzle 9 at the point on the latter where the cover plate 11 is to be located. While such cover plate may be suitably secured in place, it is preferably adapted to be simply slipped onto the nozzle and to remain in place by frictional engagement with the latter. In that case, the plate 11 will be made of rubber, rubber composition or other suitable material insuring sufficient frictional engagement with the nozzle 9 to cause retention of the cover plate 11 on said nozzle. The cover plate 11 may usually be positioned on the nozzle 9 so as to abut the outer end of valve 10 or a similarly located enlargement of the nozzle. Also, when the device is made of rubber, rubber composition or like material, it may be readily molded at low cost with the integral ribs 12 or the like. To facilitate shedding of rain from the cover plate 11, the latter is preferably provided with an inclined upper surface by gradually tapering said cover plate thinner outwardly and downwardly. In this way, the cover plate 11 may be made quite thick at the center to provide considerable surface for the wall of opening 13 which frictionally engages the nozzle 9, the cover plate being fairly stiff and durable although requiring a minimum amount of material. Obviously, the cover plate 11 may be made in any desired shape in plan, but the shape illustrated and considered most desirable is circular.

With the present attachment applied to the nozzle as shown in Figures 1 and 3, it will be seen that the open upper end of filling neck 7 will be effectively covered where it is usually left open in surrounding relation to said nozzle 9. It will also be seen that the cover plate extends well out beyond the sides of the filling neck 7 to most efficiently shed moisture and prevent entrance thereof of other foreign matter into the fuel tank through said filling neck. At the same time, sufficient space may be provided between the upper end of the filling neck 7 and the under surface of cover plate 11 to permit the escape of air from the fuel tank through said filling neck 7 as indicated by the arrows in Figure 3.

From the foregoing description, it is believed that the construction, manner of use, and advantages of the present invention will be readily understood and appreciated by those skilled in the art. Minor details illustrated and described may be changed without departing from the spirit of the invention as claimed. It will be apparent that the invention is applicable to and useful with dispensing apparatus analogous to gasoline dispensing pumps, such as oil dispensing apparatus.

What I claim as new is:

1. As a new article of manufacture, a cover plate adapted to be fitted upon the discharge nozzle of the outlet hose of a gasoline dispensing pump, said cover plate comprising a solid disk having a central opening of a size to snugly receive said nozzle and being of a diameter considerably larger than the diameters of conventional fuel tank filling necks, said cover plate further being tapered thinner outwardly and downwardly from the central opening thereof to the outer edge of the same to provide an inclined upper rain shedding surface.

2. As a new article of manufacture, a cover plate adapted to be fitted upon the discharge nozzle of the outlet hose of a gasoline dispensing pump, said cover plate comprising a solid disk having a central opening of a size to snugly receive said nozzle and being of a diameter considerably larger than the diameter of conventional fuel tank filling necks, said cover plate further having a flat lower surface provided with integral members arranged to contact the upper end of the filling neck to maintain the lower surface of said cover plate in slightly spaced relation to the upper end of said filling neck so as to permit the escape of air from the fuel tank through said filling neck and between the latter and said lower surface of the cover plate.

3. As a new article of manufacture, a cover plate adapted to be fitted upon the discharge nozzle of the outlet hose of a gasoline dispensing pump, said cover plate comprising a rubber disk having a central opening of a size to snugly receive said nozzle and being of a diameter considerably larger than the diameters of conventional fuel tank filling necks, said cover plate further being tapered thinner outwardly and downwardly from the central opening thereof to the outer edge of the same to provide an inclined upper rain shedding surface, the central portion of said cover plate being relatively thick to provide a wall of considerable area for said central opening adapted to frictionally engage the nozzle and cause maintenance of the cover plate on the latter without the aid of other means.

CHARLES K. DEWEY.